United States Patent [19]

Yamaguchi et al.

[11] Patent Number: 5,248,714

[45] Date of Patent: Sep. 28, 1993

[54] POLYISOCYANATE COMPOSITION

[75] Inventors: Shigeru Yamaguchi, Hatano; Hiroaki Katano, Yokohama; Tetsuya Tanaka, Fujisawa, all of Japan

[73] Assignee: Dow Mitsubishi Kasei Limited, Tokyo, Japan

[21] Appl. No.: 867,210

[22] PCT Filed: Oct. 31, 1991

[86] PCT No.: PCT/JP91/01494

§ 371 Date: Jun. 29, 1992

§ 102(e) Date: Jun. 29, 1992

[87] PCT Pub. No.: WO92/07890

PCT Pub. Date: May 14, 1992

[30] Foreign Application Priority Data

Oct. 31, 1990 [JP] Japan .................................. 2-294841

[51] Int. Cl.$^5$ ............................................. C08L 75/04
[52] U.S. Cl. .................................... 524/261; 524/700; 524/730; 524/265; 528/48; 528/28; 252/182.2; 252/182.21; 252/182.22

[58] Field of Search ............... 524/261, 700, 730, 265; 528/48, 28; 252/182.2, 182.21, 182.22

[56] References Cited

U.S. PATENT DOCUMENTS 4,332,742  6/1982  Allen .................................... 260/453
5,102,937  4/1992  Warren et al. ....................... 524/261

FOREIGN PATENT DOCUMENTS 59-16866  1/1984  Japan .
61-69824  4/1986  Japan .
2-145557  6/1990  Japan .

Primary Examiner—Maurice J. Welsh

[57] ABSTRACT

A polyisocyanate composition comprising 0.1% by weight or more and less than 10% by weight of a silicate compound dissolved or dispersed into at least one kind of polyisocyanate compound selected from the group consisting of diphenylmethane diisocyanate oligomers containing 20 to 60% by weight of diphenylmethane diisocyanate and the derivatives thereof. This composition has an excellent low temperature storage stability.

6 Claims, No Drawings

POLYISOCYANATE COMPOSITION

DESCRIPTION

1. Technical Field

The present invention relates to a polyisocyanate composition having an excellent low temperature storage stability.

Polyisocyanates, e.g., polymethylene polyphenyl polyisocyanate (hereinafter referred to as "polymeric MDI" or "C-MDI") are used for in many diverse applications, such as interior members such as handles and instrument pads, as automobile members, daily miscellaneous goods such as adhesives, household electric appliances such as heat insulating material for electric refrigerators, external wall materials such as side panels, heat insulating building materials such as heat insulating shutters and doors, structural heat insulating materials such as pipes and tanks, and the like.

2. Background Art

Due to the range of utilization of polymeric MDI and the derivatives thereof they are used for the production of many polyurethane products, and accordingly, although there exists a wide range of storage conditions of the raw material of these products, there are few factories or plants where the storage conditions of these substances in drum cans, oilcans or the like are thoroughly supervised. In particular, for an in situ foaming, such as spray foaming, a temperature control is not effected under normal conditions. Therefore, in winter, the raw material storage temperature is often about $-10°$ C., even in places other than severe cold districts. The studies and developments of the improvement of the storage stability of polymeric MDI and the derivatives thereof are continued on a wide scale, and isocyanate makers have put on sale large amounts of polymeric MDI with a viscosity of 160 centipoises (hereinafter referred to as "cps") or more at 25° C., which has very excellent storage stability at $-10°$ C. and is not subjected to any separation of crystals and the like.

Nevertheless, the low viscosity polymeric MDI with a viscosity at 25° C. of not higher than 160 cps, especially between 90 and 130 cps, contains a large amount of diphenylmethane diisocyanate (hereinafter referred to as "MDI") with a melting point of 38° C., and this MDI is separated at a low temperature of about $-10°$ C., and thus problems arise regarding the storage stability thereof.

Also, in line with the governmental restraint on fleon gas, started 1990, there will be an increased demand for polymeric MDI, which has a low viscosity and an excellent low temperature storage stability. Further, polyisocyanate having an excellent low temperature storage stability only is urgently required by cellular plastics makers. Nevertheless, there are no known additives soluble in polymeric MDI which can inhibit the change in reactivity and properties of the polyurethane resins obtainable therefrom to the minimum without greatly lowering the isocyanate content (hereinafter referred to as "NCO content" or "NCO %").

Furthermore, polymeric MDI contains a dimer with a concentration not lower than a predetermined value, which is insoluble in polyisocyanate comprising mutually bonded isocyanate groups, and the low temperature storage stability of polymeric MDI is influenced also by this concentration. Since this dimer is often produced when the temperature is elevated, close attention has been paid to the storage of this polymeric MDI, and the development of an isocyanate with the lowest possible storage temperature is urgently required.

DISCLOSURE OF THE INVENTION

The present inventors made intensive studies, and as a result, found that a composition comprising a polyisocyanate compound to which a silicate compound is added has a particularly good low temperature storage stability, and thus accomplished the present invention.

The present invention provides a polyisocyanate composition comprising 0.1% by weight or more 10% by weight of a silicate compound dissolved or dispersed in at least one kind of polyisocyanate compound selected from the group consisting of diphenylmethane diisocyanate oligomers containing 20 to 60% by weight of diphenylmethane diisocyanate and the derivatives thereof.

BEST MODE OF CARRYING OUT THE INVENTION

The present invention will be explained in detail below. The polyisocyanate compounds in the present invention are MDI oligomers containing 20 to 60% by weight of MDI (having the following structural formula)

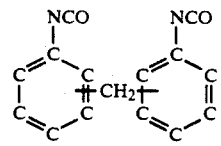

or the derivatives thereof. Preferably the MDI is contained in a polyisocyanate compound in an amount of from 40 to 57% by weight, most preferably from 45 to 54% by weight. In addition, as the derivatives of the MDI oligomers, there may be mentioned a carbodiimide modified substance with a carbodiimide bond introduced therein, and a polyol modified substance with an isocyanate group left at the terminal by the reaction of an isocyanate and a polyol, and the like. As the polyol to be used for a polyol modification, there may be used all polyols used for the production of usual polyurethanes. Such polyisocyanate compounds may be used alone or in combination. The polymeric MDI is a polymeric product of the above-described MDI, which has an NCO % of from 28 to 32% and a viscosity at 25° C. of below 2500 cps.

Next, the silicate compound used in the present invention will be explained.

The silicate compound in the present invention is a silicate oligomer obtained by polycondensing tetraalkoxysilane or by hydrolyzing the tetraalkoxysilane to a hydrolysis rate of up to 65%, and then polycondensing the thus-hydrolyzed tetraalkoxysilane. Furthermore, the silicate compound includes also modified silicate compounds obtained by reacting the silicate oligomer with an active hydrogen compound with a molecular weight not smaller than 80 and less than 500 and one functional group, in a ratio of the number of alkoxy groups/the number of active hydrogens ranging from 1 to 15, or by reacting a silicate oligomer with an active hydrogen-containing compound with a molecular weight not smaller than 500 containing 2 or less functional groups in a ratio of the number of alkoxy groups/the number of active hydrogens of from 10 to 100. Tetraalkoxysilanes are compounds represented by the formula,

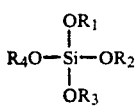

wherein the groups $R_1$ to $R_4$ may be identical or different, and are independently an alkyl group such as methyl, ethyl, propyl, butyl or octyl, which may be substituted with an aryl group, aryloxy group or the like.

A silicate oligomer may be obtained by subjecting the above-described tetraalkoxysilane monomer to hydrolysis and polycondensation. The reaction proceeds according to the following reaction formula (I). An oligomer is produced by adding a required amount of acid, neutral or alkaline water to a tetraalkoxysilane monomer and eliminating the alcohol produced by the reaction (this is produced in an amount of 2 times mols as much as the amount of the added water). By "hydrolysis rate of the silicate oligomer" is meant the value calculated according to the equation of (II), and the amount of water to be added is determined depending upon the desired hydrolysis rate.

$$Si(OR)_4 + nH_2O \rightarrow Si(OR)_{4-2n}O_n + 2nROH \quad (I)$$

$$\text{hydrolysis rate } \% = 2n/4 \times 100 = n/2 \times 100 \quad (II)$$

That is, when all of the 4 alkoxy groups of a tetraalkoxysilane are hydrolyzed, the hydrolysis rate of the tetraalkoxysilane is represented as 100%, and when 2 alkoxy groups of the tetraalkoxysilane are hydrolyzed, the hydrolysis rate of the tetraalkoxysilane is represented as 50%. Although the tetraalkoxysilane can be hydrolyzed to a hydrolysis rate of up to 100%, 100% hydrolyzed product is a complete solid of $SiO_2$, a product with a hydrolysis rate exceeding 70% is a gelatinous gel or a solid, and a product with a hydrolysis rate up to 65 to 70% having a high viscosity further reacts with a small amount of moisture in the air to be gelled, so that the storage stability is worsened and handling becomes very difficult. Accordingly, silicate oligomers with a hydrolysis rate of from 0 (i.e. tetraalkoxysilane monomer) to 65% in the present invention, preferably those having a hydrolysis rate of from 0 to 60%.

Further, as other silicate compounds, there may be used a modified silicate compound obtained by reacting the above-described silicate oligomer with an active hydrogen-containing compound with a molecular weight of not smaller than 80 and less than 500 containing one functional group, in a ratio of the number of alkoxy groups/the number of active hydrogens ranging from 1 to 15, or by reacting a silicate oligomer with an active hydrogen-containing compound with a molecular weight of 500 or more, preferably ranging from 500 to 2000 containing 2 or less functional groups, in a ratio of the number of alkoxy groups/the number of active hydrogens ranging from 10 to 100.

As the active hydrogen-containing compound herein used, there may be mentioned the following compounds I to IV.

COMPOUNDS WITH A MOLECULAR WEIGHT OF 80 OR MORE AND LESS THAN 500

I. Monovalent Alcohols

As monovalent alcohols with a molecular weight of 80 or more and less than 500, preferably those having an aromatic ring, there may be mentioned, e.g., phenol, benzyl alcohol, 2-phenoxyethanol, 2, 4-dimethylphenol and the like.

II. Polyether Series Alcohols

The compounds comprising monovalent alcohols or monovalent carboxylic acids to which an alkylene oxide is added, the molecular weight of said compounds being adjusted within the range of 80 to less than 500. As monovalent alcohols, there may be mentioned, e.g., methanol, ethanol, propanol, phenol, benzyl alcohol and the like. As monovalent carboxylic acids, there may be mentioned, e.g., formic acid, acetic acid, butyric acid, benzoic acid and the like. As alkylene oxides, there may be mentioned, e.g., ethylene oxide, propylene oxide, butylene oxide and the like.

COMPOUNDS WITH A MOLECULAR WEIGHT OF 500 OR MORE

III. Polyether Series Alcohols

① Alcohols with one functional group: alcohols comprising a monovalent alcohol or a monovalent carboxylic acid with an alkylene oxide added in an amount of at least 6 mols or more, preferably 10 mols or more, the molecular weight of said alcohols being adjusted to 500 or more, preferably within the range of 500 to 1500.

As the monovalent alcohol, monovalent carboxylic acid and alkylene oxide, there may be used, respectively, those described in II.

② Alcohols with 2 functional groups: alcohols comprising a divalent alcohol or a divalent carboxylic acid to which an alkylene oxide is added in an amount of at least 8 mols or more, preferably 10 mols or more, the molecular weight of said alcohols being adjusted to 500 or more, preferably within the range of 800 to 2000. As divalent alcohols, there may be mentioned, e.g., ethylene glycol, propylene glycol, butanediol, bisphenol A, hydroquinone, catechol and the like. As divalent carboxylic acid, there may be mentioned, e.g., maleic acid, succinic acid, adipic acid, phthalic acid, dimer acid and the like. As alkylene oxide, there may be used the same compounds as described in II.

IV. Polyester Series Alcohols

Alcohols obtained by subjecting a divalent carboxylic acid and a divalent alcohol to esterification reaction and thereby adjusting the molecular weight to 500 or more, preferably within the range of 1000 to 2000. As the divalent carboxylic acid, there may be used the same compounds as described in III. As the divalent alcohol, there may also be used the alcohols described in III and the divalent alcohols with an alkylene oxide added.

When the active hydrogen compound is a polyol or a polyester alcohol, upon reaction thereof with a silicate compound, the reaction product is gelatinized or solidified, so that this active hydrogen compound cannot be used. In addition, an active hydrogen compound with a molecular weight of less than 80 containing one functional group, or that with a molecular weight of less than 500 containing 2 or less functional groups cannot be used because the silicate oligomer reactant is not compatible with isocyanate and is separated out.

Reaction of an active hydrogen compound and a silicate oligomer is suitably carried out a) in a ratio of the number of alkoxy groups/the number of active hydrogens preferably ranging from 1 to 15, especially within a range of 3 to 15 in the case of an active hydrogen compound with a molecular weight of 80 or more and less than 500 containing one functional group, and b) in a ratio of the number of alkoxy groups/the number of active hydrogens preferably within the range of 10 to 100, especially 15 to 80 in the case of an active hydrogen compound with a molecular weight of 500 or more containing 2 or less functional groups. The ratio of the number of alkoxy groups/the number of active hydrogens referred to herein is a value represented by the following equation (III).

$$\frac{\text{number of alkoxy groups}}{\text{number of active hydrogens}} = \frac{\text{alkoxy group equivalent} \times \text{amount of used silicate oligomer}}{\text{active hydrogen equivalent} \times \text{amount of used active hydrogen-containing compound}} \quad \text{(III)}$$

By "alkoxy group equivalent" referred to herein is meant the number of alkoxy groups in a silicate oligomer. When R is a methyl group in the equation (I), the alkoxy group equivalent is given according to the equation (IV).

$$\text{alkoxy group equivalent} = \frac{4 - 2n}{28 + 31 \times (4 - 2n) + 16 \times n} \quad \text{(IV)}$$

When the hydrolysis rate is 40%, n equals 0.8, so that the alkyl group equivalent becomes 0.0208. By "active hydrogen equivalent" is meant the number of hydrogens in 1 g of an active hydrogen-containing compound, and is given by use of the hydroxyl number of this active hydrogen-containing compound according to the following equation (V).

$$\text{active hydrogen equivalent} = \frac{\text{hydroxyl number}}{56110} \quad \text{(V)}$$

The active hydrogen equivalent of an active hydrogen-containing compound with a hydroxyl number of 112 is 0.0020.

From the foregoing description, if the hydrolysis rate of a silicate oligomer and the hydroxyl number of an active hydrogen-compound are known, the conversions of both the compounds are determined. The reaction process for these compounds may be classified as follows:

① A predetermined amount of a silicate oligomer and a predetermined amount of an active hydrogen-containing compound are introduced into a reaction vessel, the obtained mixture being heated to a temperature of from 60° to 140° C. in a nitrogen atmosphere, and the alcohol produced by the reaction is eliminated. Although the reaction should be carried out until free active hydrogens are eliminated, i.e. the amount of produced alcohol becomes equimolar or more to the number of added active hydrogens, the alcohol produced in an equimolar or more to the number of added hydrogens should not be excessively eliminated, because this alcohol is an alcohol produced by the condensation of silicate oligomers. Excessive elimination of an alcohol is the same thing as elevation of the hydrolysis rate of a silicate oligomer, and excessive elevation of the hydrolysis of a silicate oligomer results in gelation or solidification of the reaction liquid mixture. A catalyst is not always required when carrying out the reaction. If a catalyst is used, there may be used a normal esterification catalyst and ester interchange catalyst, e.g., alkyl tin, magnesium acetate, calcium acetate, titanic ester and the like.

② A predetermined amount of a silicate oligomer and a predetermined amount of an active hydrogen-containing compound are introduced into a reaction vessel, and the obtained mixture is heated to a temperature ranging from 40° to 120° C. under a reduced pressure, following which the alcohol produced by the reaction is eliminated. To the produced alcohol and the catalyst to be used, there may be applied the foregoing paragraph ①.

A silicate oligomer and a compound with a molecular weight of 80 or more and less than 500 containing one active hydrogen are reacted preferably in a ratio of the number of alkoxy groups/the number of active hydrogens ranging from 1 to 15, especially from 3 to 15. If this ratio is less than 1, an alcohol is remained and this alcohol reacts with an isocyanate, so that these compounds cannot be mixed. On the contrary, if this ratio exceeds 15, the amount of the active hydrogen-containing compound is so small that the reaction product does not become solubilized in an isocyanate. In addition, a silicate oligomer and a compound with a molecular weight of 500 or more containing 1 or 2 active hydrogens are reacted preferably in a ratio of the number of alkoxy groups/the number of active hydrogens within a range of 10 to 100, especially 15 to 18. If this ratio is less than 10, the amount of the active hydrogen-containing compound is so large that the reaction product is gelled or solidified. On the contrary, if this ratio exceeds 100, the amount of the active hydrogen-containing compound is so small that the reaction product does not become solubilized in an isocyanate.

The modified silicate compound of the present invention, which is obtained by reacting a silicate oligomer and an active hydrogen-containing compound in such a manner as described in the foregoing, has a viscosity of from 0.001 to 1000 poise measured at 25° C. by use of a rotational viscometer, and has the characteristic of having substantially no active hydrogens because a reaction of the silicate compound with an isocyanate did not occur in the working example described hereafter. In the present invention, a preferable modified silicate compound is that having a viscosity of from 0.001 to 100 poise, more preferably that having a viscosity of from 0.01 to 5 poise.

Such a silicate compound of the present invention as described above can be made a normal stabilized composition by dissolving it in polyisocyanate or by decomposing same. In the present invention, the mixing rate of the silicate compound into polyisocyanate is within the range of 0.1% by weight or more and less than 10% by weight, preferably within the range of 0.2% by weight to 5% by weight of the silicate compound based on the weight of the polyisocyanate. If this rate is less than 0.1% by weight, the low temperature storage stability of the composition becomes lowered and the effect of addition of the silicate compound becomes lessened. On the contrary, if the rate exceeds 10% by weight, a lowering of the water resistance of the obtained composition becomes problematic. That is, scrupulous care should be taken with regard to water when storing and handling the obtained liquid mixture. Especially the silicate compound is more highly reactive to water than the isocyanate, and therefore, the silicate compound reacts easily with the moisture in the air to produce insoluble silica ($SiO_2$). In addition, another isocyanate, a silicone surface active agent, and an organic solvent, all being soluble in this liquid mixture, may be used by adding any of these substances to the liquid mixture.

In the following, the present invention will be explained with reference to working examples and comparative examples, but the present invention is not limited to these working examples.

EXAMPLES 1 TO 10, COMPARATIVE EXAMPLES 1 TO 13

Various polyisocyanate compounds having the compositions shown in Table 1 and additives such as silicate compounds also shown in Table 1 were mixed to obtain polyisocyanate compositions, and the properties of the thus obtained polyisocyanate compositions were evaluated. The results of the evaluation are set forth in Table 1.

The marks ○, Δ and × in the solubilization test in Table 1 show, respectively, a visually inspected solubilization test result. ○ indicates a solubilized state, Δ an average dispersed state and × a separated state. Among these criteria, the state where a silicate compound and a polyisocyanate are separated from each other to form 2 layers is judged as a separated state, and the state where the moisture in the air is admixed during the mixing of a compound and an additive and the modified silicate is hydrolyzed to produce solid $SiO_2$ only is judged as a solubilized state.

In addition, with respect to a low temperature storage stability of compositions, a liquid mixture was introduced into a hermetically sealed vessel and stored for a period of from a week to one month in an atmosphere of −10° C., whereupon it was visually observed whether or not crystals or the like are separated. ○ indicates a state where neither a separation of crystals nor a turbidity was observed, Δ a state where no crystals are separated but a turbidity was observed, or where the silicate compound was dispersed and a turbidity was recognized, and × a state where a separation of crystals was observed.

TABLE 1

|  | Polyisocyanate Compound | | | Added Compound | | Solubilization Test | Low Temperature Storage Stability −10° C. | |
|---|---|---|---|---|---|---|---|---|
|  | MDI content (%) | Dimer content (%) | Viscosity cps 25° C. | Name | Loadings pbw | | 2 weeks | one month |
| Comparative Example 1 | 42.6 | 0.7 | 178 | — | — | — | ○ | Δ |
| Example 1 | " | " | " | tetraethyl silicate | 1.0 | ○ | ○ | ○ |
| Comparative Example 2 | 46.0 | 0.7 | 138 | — | — | — | × | × |
| Comparative Example 3 | 47.2 | 0.7 | 129 | — | — | — | × | × |
| Comparative Example 4 | " | " | " | xylene | 2.0 | ○ | × | × |
| Comparative Example 5 | " | " | " | CLP | 2.0 | ○ | × | × |
| Example 2 | " | " | " | tetraethyl silicate | 1.0 | ○ | ○ | ○ |
| Comparative Example 6 | 51.2 | 0.7 | 95 | — | — | — | × | × |
| Example 3 | " | " | " | tetraethyl silicate | 1.0 | ○ | ○ | ○ |
| Comparative Example 7 | 54.1 | 0.7 | 78 | — | — | — | × | × |
| Example 4 | " | " | " | tetraethyl silicate | 1.0 | ○ | ○ | ○ |
| Comparative Example 8 | 57.0 | 0.7 | 65 | — | — | — | × | × |
| Example 5 | " | " | " | tetraethyl silicate | 1.0 | ○ | ○ | Δ |
| Comparative Example 9 | 59.8 | 0.7 | 55 | — | — | — | × | × |
| Example 6 | " | " | " | tetraethyl silicate | 1.0 | ○ | ○ | Δ |
| Example 7 | " | " | " | tetraethyl silicate | 5.0 | ○ | ○ | ○ |
| Comparative Example 10 | 62.7 | 0.7 | 47 | tetraethyl silicate | 5.0 | ○ | × | × |
| Comparative Example 11 | 22.0 | 0.7 | 1600 | — | — | — | ○ | Δ |
| Example 8 | " | " | " | tetraethyl silicate | 1.0 | ○ | ○ | ○ |
| Comparative Example 12 | 40.4 | 0.9 | 202 | — | — | — | Δ | × |
| Example 9 | 40.4 | 0.9 | 202 | tetraethyl silicate | 1.0 | ○ | ○ | ○ |
| Comparative Example 13 | 43.2 | 1.2 | 161 | — | — | — | × | × |
| Example 10 | 43.2 | 1.2 | 161 | tetraethyl silicate | 1.0 | ○ | ○ | ○ |

CLP: trischloroethyl phosphate
Loading: pbw = parts by weight (based on 100 pbw of polyisocyanate)

EXAMPLES 11 TO 26

Various alkoxysilane compounds set forth in Table 2 were added to the polyisocyanate compound used in Comparative Example 3 to obtain polyisocyanate compositions, and the properties of the thus obtained polyisocyanate compositions were evaluated. The results of evaluation are set forth in Table 2.

TABLE 2

| | Silicate Compound | | Solubilization Test | Low Temperature Storage Stability −10° C. | |
|---|---|---|---|---|---|
| | Name | Loads | | 2 weeks | one month |
| Comparative Example 3 | Nothing was added | — | — | x | x |
| Example 11 | tetramethyl silicate with a hydrolysis rate of 40% | 2.0 | Δ | Δ | Δ |
| Example 12 | tetraethyl silicate | 0.1 | o | o | o |
| Example 13 | | 0.5 | o | o | o |
| Example 14 | | 2.0 | o | o | o |
| Example 15 | | 5.0 | o | o | o |
| Example 16 | | 9.5 | o | o | o |
| Example 17 | tetraethyl silicate with a hydrolysis rate of 40% | 2.0 | Δ | Δ | Δ |
| Example 18 | tetrapropyl silicate | 0.5 | o | o | o |
| Example 19 | | 2.0 | o | o | o |
| Example 20 | | 5.0 | o | o | o |
| Example 21 | tetrabutyl silicate | 0.5 | o | o | o |
| Example 22 | | 2.0 | o | o | o |
| Example 23 | | 5.0 | o | o | o |
| Example 24 | tetraisoamyl silicate | 0.5 | o | o | o |
| Example 25 | | 2.0 | o | o | o |
| Example 26 | tetra 2-phenoxyethyl silicate | 2.0 | o | o | o |

PREPARATION EXAMPLE 1

A tetramethyl silicate oligomer with a hydrolysis rate of 40% and an addition polymerized polyether polyol of ethylene oxide (hereinafter referred to as "EO" for short) and propylene oxide (hereinafter referred to as "PO" for short) (EO/PO=60/40 wt %, molecular weight 1400, hydroxyl value 80) were introduced into a reaction vessel in a proportion of the number of alkyl groups/the number of active hydrogens ratio=20, heated in a nitrogen atmosphere, reacted at a temperature of 100° C., and the produced alcohol was eliminated by distillation, so that a silicate compound with a viscosity of 0.13 p was obtained. The result obtained by mixing the thus obtained silicate compound and the polyisocyanate in Comparative Example 3 is set forth in Table 3.

PREPARATION EXAMPLE 2

The same compounds as those in Preparation Example 1 were introduced into a reaction vessel in the same reaction rate as that in Preparation Example 1, heated to a temperature of from 80° to 100° C. under a reduced pressure of from 3 to 10 mmHg, and methyl alcohol produced by the reaction was eliminated, so that a silicate compound with a viscosity of 0.14 p was obtained. The result obtained by mixing the thus obtained silicate compound and the polyisocyanate in Comparative Example 3 is set forth in Table 3.

PREPARATION EXAMPLE 3

A tetramethyl silicate oligomer with a hydrolysis rate of 40% and polyether alcohol (molecular weight 700, hydroxyl value 80) obtained by addition of EO to n-butanol were reacted under a reduced pressure as in Preparation Example 2 in a ratio of the number of alkoxy groups/the number of active hydrogens=25, so that a silicate compound with a viscosity of 0.25 p was obtained. The result obtained by mixing the thus obtained silicate compound with the polyisocyanate in Comparative Example 3 is set forth in Table 3.

PREPARATION EXAMPLE 4

The same compounds as those in Preparation Example 3 were reacted under a reduced pressure as in Preparation Example 1, in a proportion of the number of alkoxy groups/the number of active hydrogens ratio=4, so that a silicate compound with a viscosity of 0.18 p was obtained. The result obtained by mixing the thus obtained silicate compound with the polyisocyanate in Comparative Example 3 is set forth in Table 3.

PREPARATION EXAMPLE 5

A tetramethyl silicate oligomer with a hydrolysis rate of 40% and an addition polymerized polyether polyol of EO and PO (EO/PO=60/40 wt %, molecular weight 1400, hydroxyl value 80) were introduced in a reaction vessel in a proportion of the number of alkyl groups/the number of active hydrogens ratio=20, heated in a nitrogen atmosphere, reacted at a temperature of 100° C., and the produced alcohol was eliminated by distillation, so that a silicate compound with a viscosity of 2.10 p was obtained The result obtained by mixing the thus obtained silicate compound and the polyisocyanate in Comparative Example 3 is set forth in Table 3.

PREPARATION EXAMPLE 6

The same compounds as those in Preparation Example 5 were introduced into a reaction vessel in the same reaction rate as that in Preparation Example 5, heated to a temperature ranging from 80° to 100° C. under a reduced pressure of from 3 to 19 mmHg, and methyl alcohol produced by the reaction was eliminated, so that a silicate compound with a viscosity of 2.10 p was obtained. The result obtained by mixing the thus obtained silicate compound with the polyisocyanate in Comparative Example 3 is set forth in Table 3.

PREPARATION EXAMPLE 7

A tetramethyl silicate oligomer with a hydrolysis rate of 50% and polyether alcohol (molecular weight 700, hydroxyl value 80) obtained by addition of EO to n-butanol were reacted under a reduced pressure as in Preparation Example 6 in a ratio of the number of alkoxy groups/the number of active hydrogens=25, so that a silicate compound with a viscosity of 2.00 p was obtained. The result obtained by mixing the thus obtained silicate compound with the polyisocyanate in Comparative Example 3 is set forth in Table 3.

PREPARATION EXAMPLE 8

A tetramethyl silicate oligomer with a hydrolysis rate of 40% and polyester polyol (molecular weight 2000, hydroxyl value 56) obtained by reacting adipic acid and 1,4-butanediol were reacted under a reduced pressure as in Preparation Example 6 in a ratio of the number of alkoxy groups/the number of active hydrogens=20, so that a silicate compound with a viscosity of 1.70 p was obtained The result obtained by mixing the thus obtained silicate compound with the polyisocyanate in Comparative Example 3 is set forth in Table 3.

COMPARATIVE EXAMPLE 14

The same compounds as those in Preparation Example 2 were reacted in the same manner as in Preparation Example 2 in a proportion of the number of alkyl groups/the number of active hydrogens ratio=200, so that a silicate compound was obtained. The result obtained by mixing the thus obtained silicate compound with the polyisocyanate in Comparative Example 3 is set forth in Table 3.

COMPARATIVE EXAMPLE 15

A tetramethyl silicate oligomer with a hydrolysis rate of 40% and a polyether alcohol prepared by adding EO to n-butanol (molecular weight 350, hydroxyl value 160) were reacted in the same manner as in Preparation Example 2, so that a silicate compound was obtained. The result obtained by mixing the thus obtained silicate compound and the polyisocyanate in Comparative Example 3 is set forth in Table 3.

TABLE 3

|  | Silicate Compound | | Solubilization Test | Low Temperature Storage Stability −10° C. | |
|---|---|---|---|---|---|
|  | Name | Loads |  | 2 weeks | one month |
| Comparative Example 3 | Nothing was added | — | — | x | x |
| Example 27 | Preparation Example 1 silicate compound | 2.0 | Δ | Δ | Δ |
| Example 28 | Preparation Example 2 silicate compound | 2.0 | Δ | Δ | Δ |
| Example 29 | Preparation Example 3 silicate compound | 2.0 | Δ | Δ | Δ |
| Example 30 | Preparation Example 4 silicate compound | 2.0 | Δ | Δ | Δ |
| Example 31 | Preparation Example 5 silicate compound | 2.0 | Δ | Δ | Δ |
| Example 32 | Preparation Example 6 silicate compound | 2.0 | Δ | Δ | Δ |
| Example 33 | Preparation Example 7 silicate compound | 2.0 | Δ | Δ | Δ |
| Example 34 | Preparation Example 8 silicate compound | 2.0 | Δ | Δ | Δ |
| Comparative Example 14 | comparative Example 1 silicate compound | 2.0 | x | — | — |
| Comparative Example 15 | Comparative Example 1 silicate compound | 2.0 | x | — | — |

EXAMPLES 35 TO 47, COMPARATIVE EXAMPLE 16

Polyisocyanate compositions were obtained by adding various silicate compounds set forth in Table 4 to a polyisocyanate compound with a MDI content of 48.3% and a viscosity of 119 cps (25° C.). The evaluation results for these compositions are set forth in Table 4.

TABLE 4

|  | Silicate Compound | | Solubilization Test | Low Temperature Storage Stability −10° C. | |
|---|---|---|---|---|---|
|  | Name | Loads |  | 2 weeks | one month |
| Comparative Example 3 | Nothing was added | — | — | x | x |
| Example 35 | tetramethyl silicate with a hydrolysis rate of 40% | 2.0 | Δ | Δ | Δ |
| Example 36 | tetraethyl silicate | 0.5 | ○ | ○ | ○ |
| Example 37 |  | 2.0 | ○ | ○ | ○ |
| Example 38 |  | 5.0 | ○ | ○ | ○ |
| Example 39 | tetramethyl silicate with a hydrolysis rate of 40% | 2.0 | Δ | Δ | Δ |
| Example 40 | tetrapropyl silicate | 0.5 | ○ | ○ | ○ |
| Example 41 |  | 2.0 | ○ | ○ | ○ |
| Example 42 |  | 5.0 | ○ | ○ | ○ |
| Example 43 | tetrabutyl silicate | 0.5 | ○ | ○ | ○ |
| Example 44 |  | 2.0 | ○ | ○ | ○ |
| Example 45 |  | 5.0 | ○ | ○ | ○ |
| Example 46 | tetraisoamyl silicate | 0.5 | ○ | ○ | ○ |
| Example 47 |  | 5.0 | ○ | ○ | ○ |

INDUSTRIAL APPLICABILITY

According to the present invention, there is provided a polyisocyanate composition having an excellent in low temperature storage stability, and the present invention will greatly contribute to the technical field of the production of polyurethane resins and the like, wherein this composition is used.

We claim:

1. A polyisocyanate composition comprising from 0.1% to 10% by weight of a silicate oligomer obtained by polycondensing tetraalkoxysilane or hydrolyzing tetraalkoxysilane to a hydrolysis rate up to 65% and then polycondensing the thus hydrolyzed tetraalkoxysilane dissolved or dispersed in at least one kind of polyisocyanate compound selected from the group consisting of diphenylmethane diisocyanate oligomers containing 20 to 60% by weight of diphenylmethane diisocyanate and the derivatives thereof.

2. A composition according to claim 1 wherein the content of diphenylmethane diisocyante in the polyisocyanate compound is within the range of 40 to 57% by weight.

3. A composition according to claim 1 wherein the derivatives of the diphenylmethane diisocyanate oligomers are carbodiimide modified substances or polyol modified substances with an isocyanate group left at the terminal by reacting an isocyanate and a polyol.

4. A composition according to claim 1 wherein the silicate oligomer is further modified by reacting said silicate oligomer and an active hydrogen compound with a molecular weight from 80 to 500 containing one functional group in a ratio of the number of alkoxy groups/the number of active hydrogens of from 1 to 15, or reacting the silicate oligomer and an active hydrogen-containing compound with a molecular weight of 500 or more containing 2 or less functional groups in a ratio of the number of alkoxy groups/the number of active hydrogens of from 10 to 100.

5. A composition according to claim 4 wherein the hydrolysis rate is 60% or less.

6. A composition according to claim 4 wherein tetraalkoxysilane is a compound represented by the following formula

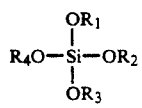

wherein $R_1$ to $R_4$ may be identical or different and denote independently an alkyl group such as methyl, ethyl, propyl, butyl or octyl, which may be substituted with an aryl group, aryloxy group or the like.

* * * * *